United States Patent Office 3,549,349
Patented Dec. 22, 1970

3,549,349
HERBICIDAL COMBINATIONS
James V. Gramlich, Greenfield, Ind., assignor to Eli Lilly and Company, Indianapolis, Ind., a corporation of Indiana
No Drawing. Continuation-in-part of application Ser. No. 723,237, Apr. 22, 1968, which is a continuation-in-part of application Ser. No. 714,077, Mar. 18, 1968. This application June 30, 1969, Ser. No. 837,904
Int. Cl. A01n 9/14, 9/24, 9/20
U.S. Cl. 71—103  4 Claims

ABSTRACT OF THE DISCLOSURE

A combination containing a $N^4,N^4$-di-n-propyl-3,5-dinitrosulfanilamide and 2,4-D or MCPA or dicamba or carboxyl derivatives thereof is useful for eliminating virtually all weeds from paddies in which rice has been transplanted.

CROSS-REFERENCE

This application is a continuation-in-part of my copending application, Ser. No. 723,237, filed Apr. 22, 1968, now abandoned, which is in turn a continuation-in-part of application Ser. No. 714,077 filed Mar. 18, 1968, now abandoned.

BACKGROUND OF THE INVENTION

According to U.S. Pat. 3,367,949, alkylated 3,5-dinitrosulfanilamides are extremely effective pre-emergence herbicides for virtually all grass weeds and for a number of genera of broadleaf weeds. These 3,5-dinitrosulfanilamides do not affect the growth of monocotyledenous crop plants, particularly corn, when applied to the crop-growing area pre-emergently to the weeds and post-emergently to the crop. 2,4-dichlorophenoxyacetic acid and its relatives, such as MCPA, in the form of various derivatives including esters and salts have been known for many years as excellent post-emergence, broad-spectrum herbicides effective against dicotyledenous plants. Similarly, chlorinated benzoic acids such as dicamba include among their number marketed broad-spectrum post-emergence herbicides for dicotyledenous plants.

SUMMARY

This invention provides a process for eliminating virtually all weed species from rice paddies comprising the application to a paddy in which rice has been transplanted at least 6 days previously in synergistic combination of from $\frac{1}{8}$ to $\frac{1}{2}$ pound per acre of $N^4,N^4$-di-n-propyl-3,5-dinitrosulfanilamide (oryzalin) in combination with from $\frac{1}{16}$ to $\frac{1}{4}$ pound per acre of 2,4-di-chlorophenoxyacetic acid (2,4–D) or a carboxyl derivative thereof, as represented by Formula I below:

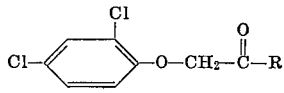

(I)

or from $\frac{1}{16}$ to $\frac{1}{8}$ pound per acre of 2-methyl-4-chlorophenoxyacetic acid (MCPA) or a carboxyl derivative thereof, as represented by Formula II below:

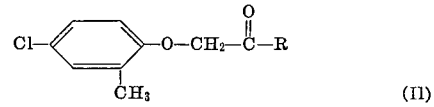

(II)

or from $\frac{1}{16}$ to $\frac{1}{8}$ pound per acre of 2-methoxy-3,6-dichlorobenzoic acid (dicamba) or a carboxyl derivative thereof, as represented by Formula III below:

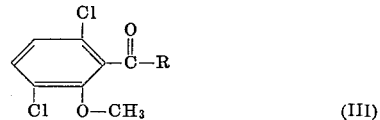

(III)

In Formulas I, II and III above,
R is

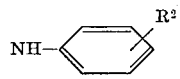

wherein $R^2$ is halo, $C_1$–$C_3$ alkyl or halo-substituted $C_1$–$C_3$ alkyl. Included within the scope of the term $R^2$ are fluoro, chloro, bromo, iodo, methyl, ethyl, isopropyl, trifluoromethyl, difluoromethyl or the like, or $C_3$–$C_5$ alkenyl such as allyl or methallyl;

OM, wherein M is an alkali metal such as sodium or potassium or a metalloid ion such as ammonium, trimethylammonium, morpholinium or other like ion; or $OR^3$, wherein $R^3$ is hydrogen or an alkyl or alkoxyalkyl group containing less than 9 carbon atoms such as methyl, ethyl, n-propyl, hexyl, iso-octyl, ethoxyethyl, butoxypropyl and the like, or $C_3$–$C_5$ alkenyl such as allyl or methallyl.

Formulas I, II and III above include the following compounds:

2-methyl-4-chlorophenoxyacetic acid (MCPA);
2-methyl-4-chlorophenoxyacet-(3-trifluoromethyl) anilide;
2-methyl-4-chlorophenoxyacet-(2-chloro)anilide;
iso-octyl 2,4-dichlorophenoxyacetate;
n-butoxy-n-propyl 2,4-dichlorophenoxyacetate;
2,4-dichlorophenoxyacetic acid (2,4–D);
allyl 2-methyl-4-chlorophenoxyacetate;
2,4-dichlorophenoxyacetic acid, ammonium salt;
2-methyl-4-chlorophenoxyacetic acid, trimethylamine salt.

For use in the process of my invention, oryzalin, 2,4–D or MCPA or dicamba (including carboxyl derivatives thereof) are formulated together as emulsifiable concentrates, spreadable dusts, wettable powders or extruded granules. Typical formulations suitable for use in my novel process are prepared as follows:

EMULSIFIABLE CONCENTRATE

Twenty-one grams of a mixture containing 75 percent of oryzalin are dissolved in 25 liters of a 1:1 acetone: ethanol mixture. The above solution is added to 225 liters of an aqueous surfactant system containing water and 350 p.p.m. of an anionic-nonionic surfactant mixture. Sixteen grams of 2,4-D acid (as the potassium salt) are added.

Suitable anionic surfactants for use in the above emulsifiable concentrate include the calcium salts of myristylbenzenesulfonic acid or laurylbenzenesulfonic acid. Useful non-ionic surfactants for blending with the above anionic surfactants include the oleate ester of a polyoxyethyleneglycol of molecular weight of about 350 or the mono- or di-resin acid esters of a polyoxyethyleneglycol of molecular weight of about 500.

GRANULAR FORMULATIONS

(I)

A mixture containing 1.6 g. of sodium 2,4-dichlorophenoxyacetate (90 percent active material) and 2 g. of a mixture containing 75 percent oryzalin are milled with ethyleneglycol and the resulting mixture dispersed on granulated limestone to yield a granular formulation containing 1.83 percent 2,4-D acid, 2.74 percent oryzalin, 1.5 percent ethyleneglycol and 93.93 percent granular limestone.

(II)

One and six-tenths parts of a mixture containing 80 percent MCPA (as the potassium salt) dissolved in an equal quantity of water is added to two parts of a wettable powder milled in air containing the following ingredients: 76.5 percent oryzalin, 3 percent of a sulfonated lignin, 3 percent sodium lauryl sulfate, and 17.5 percent of a finely ground calcium silicate. The resulting mixture was diluted with 1.2 parts of water and dispersed on limestone to which had been added 0.8 g. of microprecipitated calcium silicate to give a granular formulation containing the following ingredients: 2.06 percent MCPA, 2.74 percent oryzalin, 1.5 percent water, 92.9 percent limestone, and 0.8 percent finely divided calcium silicate.

When the herbicidal combinations of this invention are applied post-emergence to transplant rice in a rice paddy and pre-or post-emergence or both to the weeds, the herbicide can either be sprayed onto the soil area in the form of an emulsion, or spread onto the soil area in granular form or applied directly to the flood water surface by spray or granule.

The herbicidal combination is applied to the rice paddy containing transplant rice at a rate such that from ⅛ to ½ pound of oryzalin and from ⅛ to ¼ pound of a 2,4-D or from ¹⁄₁₆ to ⅛ pound of MCPA or from ¹⁄₁₆ to ⅛ pound of dicamba or carboxyl derivatives of the above acids are applied per acre. Such combinations when properly formulated and applied provide excellent broad-spectrum weed control at application rates lower than would be required for each constituent of the combination alone, and demonstrate a synergistic effect.

The broad-spectrum pre-emergence herbicidal activity of a herbicidal combination coming within the scope of this invention is exemplified by the data contained in Table 1 which follows. In the table, column 1 gives the application rate for oryzalin, column 3 the application rate of either 2,4-D, MCPA, or dicamba, and column 5 the application rates for each herbicide in the combination under test. Columns 2, 4 and 6 give the average injury rating for the particular weed at the specified application rates using the following injury rating scale:

No injury _____ 0
Slight injury _____ 1–3
Moderate injury _____ 4–6
Severe injury _____ 7–9
Death _____ 10

Injury ratings and observations as to type of injury were made in each case 12 days after treatment. The table also includes information as to the relative activity of each of the components of the various combinations when utilized alone at similar concentrations.

TABLE 1

[Velvet Leaf]

| Oryzalin | | Dicamba | | Combination | |
|---|---|---|---|---|---|
| Rate | Injury rating | Rate | Injury rating | Rate | Injury rating |
| ⅛ | 0 | ¹⁄₁₆ | 3.0 | ⅛+¹⁄₁₆ | 6.3 |
| ¼ | 0 | ¹⁄₁₆ | 3.0 | ¼+¹⁄₁₆ | 2.2 |
| ½ | 1.0 | ¹⁄₁₆ | 3.0 | ½+¹⁄₁₆ | 9.3 |

| Oryzalin | | 2,4-D | | Combination | |
|---|---|---|---|---|---|
| ⅛ | 0 | ¹⁄₁₆ | 0 | ⅛+¹⁄₁₆ | 0 |
| ¼ | 0 | ¹⁄₁₆ | 0 | ¼+¹⁄₁₆ | 3.3 |
| ½ | 1 | ¹⁄₁₆ | 0 | ½+¹⁄₁₆ | 5.0 |
| ⅛ | 0 | ⅛ | 0 | ⅛+⅛ | 0 |
| ¼ | 0 | ⅛ | 0 | ¼+⅛ | 4.0 |
| ½ | 1 | ⅛ | 0 | ½+⅛ | 7.0 |
| ⅛ | 0 | ¼ | 1 | ⅛+¼ | 2.0 |
| ¼ | 0 | ¼ | 1 | ¼+¼ | 4.7 |
| ½ | 1 | ¼ | 1 | ½+¼ | 5.7 |

| Oryzalin | | MCPA | | Combination | |
|---|---|---|---|---|---|
| ⅛ | 0 | ¹⁄₁₆ | 0 | ⅛+¹⁄₁₆ | 1.7 |
| ¼ | 0 | ¹⁄₁₆ | 0 | ¼+¹⁄₁₆ | 5.7 |
| ½ | 1 | ¹⁄₁₆ | 0 | ½+¹⁄₁₆ | 4.7 |
| ⅛ | 0 | ⅛ | 1.3 | ⅛+⅛ | 6.0 |
| ¼ | 0 | ⅛ | 1.3 | ¼+⅛ | 6.3 |
| ½ | 1 | ⅛ | 1.3 | ½+⅛ | 6.0 |

[Jimson Weed]

| Oryzalin | | Dicamba | | Combination | |
|---|---|---|---|---|---|
| Rate | Injury rating | Rate | Injury rating | Rate | Injury rating |
| ⅛ | 0 | ¹⁄₁₆ | 2.7 | ⅛+¹⁄₁₆ | 3.3 |
| ¼ | 0.3 | ¹⁄₁₆ | 2.7 | ¼+¹⁄₁₆ | 2.3 |
| ½ | 1.7 | ¹⁄₁₆ | 2.7 | ½+¹⁄₁₆ | 9.9 |

[Foxtail]

| Oryzalin | | MCPA | | Combination | |
|---|---|---|---|---|---|
| Rate | Injury rating | Rate | Injury rating | Rate | Injury rating |
| ⅛ | 0 | ¹⁄₁₆ | 0 | ⅛+¹⁄₁₆ | 1.3 |
| ¼ | 0 | ¹⁄₁₆ | 0 | ¼+¹⁄₁₆ | 2.0 |
| ½ | 2 | ¹⁄₁₆ | 0 | ½+¹⁄₁₆ | 7.0 |
| ⅛ | 0 | ⅛ | 1.3 | ⅛+⅛ | 4.3 |
| ¼ | 0 | ⅛ | 1.3 | ¼+⅛ | 5.3 |
| ½ | 2 | ⅛ | 1.3 | ½+⅛ | 4.7 |

| Oryzalin | | 2,4-D | | Combination | |
|---|---|---|---|---|---|
| ⅛ | 0 | ¹⁄₁₆ | 0 | ⅛+¹⁄₁₆ | 1.3 |
| ¼ | 0 | ¹⁄₁₆ | 0 | ¼+¹⁄₁₆ | 4.3 |
| ½ | 2 | ¹⁄₁₆ | 0 | ½+¹⁄₁₆ | 7.3 |
| ⅛ | 0 | ⅛ | 0 | ⅛+⅛ | 2.0 |
| ¼ | 0 | ⅛ | 0 | ¼+⅛ | 6.7 |
| ½ | 2 | ⅛ | 0 | ½+⅛ | 7.7 |

[Mustard]

| Oryzalin | | 2,4-D | | Combination | |
|---|---|---|---|---|---|
| Rate | Injury rating | Rate | Injury rating | Rate | Injury rating |
| ⅛ | 4.3 | ¹⁄₁₆ | 0 | ⅛+¹⁄₁₆ | 9.1 |

[Large Crabgrass]

| Oryzalin | | MCPA | | Combination | |
|---|---|---|---|---|---|
| Rate | Injury rating | Rate | Injury rating | Rate | Injury rating |
| ⅛ | 2.7 | ¹⁄₁₆ | 0 | ⅛+¹⁄₁₆ | 6.5 |

[Barnyard Grass]

| Oryzalin | | MCPA | | Combination | |
|---|---|---|---|---|---|
| Rate | Injury rating | Rate | Injury rating | Rate | Injury rating |
| ⅛ | 1.7 | ¹⁄₁₆ | 0 | ⅛+¹⁄₁₆ | 4.3 |
| ¼ | 2.7 | ¹⁄₁₆ | 0 | ¼+¹⁄₁₆ | 7.7 |
| ⅛ | 1.7 | ⅛ | 1.7 | ⅛+⅛ | 6.7 |
| ¼ | 2.7 | ⅛ | 1.7 | ¼+⅛ | 8.3 |

| Oryzalin | | 2,4-D | | Combination | |
|---|---|---|---|---|---|
| ⅛ | 1.7 | ¹⁄₁₆ | 0 | ⅛+¹⁄₁₆ | 2.7 |
| ¼ | 2.7 | ¹⁄₁₆ | 0 | ¼+¹⁄₁₆ | 3.3 |
| ⅛ | 1.7 | ⅛ | 0 | ⅛+⅛ | 2.7 |
| ¼ | 2.7 | ⅛ | 0 | ¼+⅛ | 4.0 |

| Oryzalin | | Dicamba | | Combination | |
|---|---|---|---|---|---|
| ⅛ | 1.7 | ¹⁄₁₆ | 0 | ⅛+¹⁄₁₆ | 4.7 |
| ¼ | 2.7 | ¹⁄₁₆ | 0 | ¼+¹⁄₁₆ | 6.7 |
| ⅛ | 1.7 | ⅛ | 2.7 | ⅛+⅛ | 6.3 |
| ¼ | 2.7 | ⅛ | 2.7 | ¼+⅛ | 8.7 |

It will be noted from the above table that oryzalin in combination with MCPA, 2,4-D or dicamba causes moderate to severe injury to barnyard grass and large crabgrass, as well as jimson weed, velvet leaf, mustard and foxtail at rates of ⅛ to ½ pound of oryzalin and at rates of ¹⁄₁₆ to ½ pound of 2,4-D or from ¹⁄₁₆ to ⅛ pound of MCPA or ¹⁄₁₆ pound of dicamba. These rates are well below that at which any of the herbicides taken alone give effective herbicidal control since each must be applied at rates in excess of ¼ to ½ pound per acre for satisfactory grass control.

In addition, field trials with transplant rice in paddies have clearly demonstrated the herbicidal utility of combinations of this invention. Table 2 which follows gives the results of a typical field trial in which a combination of oryzalin and MCPA (as the potassium salt) was used. In the table, column 1 gives application rates for each of the herbicides in kilograms per hectare, column 2 the time of application in days after transplanting the rice and seeding the weed, column 3 the herbicidal effectiveness (average of two replicates) against *Echinochloa crusgalli* (barnyard grass or watergrass), using the same scale as in Table 1, column 4 the herbicidal effectiveness against *Monochoria vaginalis* (a broadleaf weed), and column 5 the herbicidal effectiveness against *Cyperus difformis* (an annual sedge). There was very little crop injury seen in these field trials.

TABLE 2

| Oryzalin, kg./Ha. plus MCPA* | Application, days after transplanting | Herbicidal effectiveness against— | | |
|---|---|---|---|---|
| | | Echinochloa Crusgalli | Monochoria vaginalis | Cyperus difformis |
| 0.25 | 0.4 | 3 | 10 | |
| 0.5 | 0.4 | 3 | 10 | |
| 0.7 | 0.4 | 3 | 9.75 | |
| 0.25 | 0.4 | 7 | 10 | |
| 0.5 | 0.4 | 7 | 9.75 | |
| 0.7 | 0.4 | 7 | 10 | |
| 0.25 | 0.4 | 11 | 9.75 | |
| 0.5 | 0.4 | 11 | 10 | |
| 0.7 | 0.4 | 11 | 10 | |
| 0.25 | 0.4 | 3 | | 10 |
| 0.5 | 0.4 | 3 | | 10 |
| 0.7 | 0.4 | 3 | | 10 |
| 0.25 | 0.4 | 7 | | 10 |
| 0.5 | 0.4 | 7 | | 10 |
| 0.7 | 0.4 | 7 | | 9 |
| 0.25 | 0.4 | 11 | | 10 |
| 0.5 | 0.4 | 11 | | 10 |
| 0.7 | 0.4 | 11 | | 10 |
| 0.25 | 0.4 | 3 | | 10 |
| 0.5 | 0.4 | 3 | | 10 |
| 0.7 | 0.4 | 3 | | 9.5 |
| 0.25 | 0.4 | 7 | | 10 |
| 0.5 | 0.4 | 7 | | 10 |
| 0.7 | 0.4 | 7 | | 10 |
| 0.25 | 0.4 | 11 | | 9.75 |
| 0.5 | 0.4 | 11 | | 10 |
| 0.7 | 0.4 | 11 | | 9.75 |

* MCPA as the potassium salt.

Table 3 below gives the result of additional field trials employing the herbicidal combinations which demonstrate the efficacy of these combinations in eliminating weeds and in particular barnyard grass from rice paddies in which rice has been transplanted. In this trial, the rice is transplanted and the area seeded to barnyard grass on the same day. Treatment is applied 11 days after transplanting, by which time the barnyard grass has achieved considerable growth. In the table, column 1 gives the names of the herbicides used in the combination, column 2 the application rate in pounds per acre, column 3 the weed control rating and column 4 the crop injury rating. The ratings are on the same 0–10 scale used in the previous tables. The table also contains similar information for each of the ingredients employed in a combination alone at identical rates to those used in the combinations.

TABLE 3

| Treatment | Rate, lb./A. | Weed control rating | Crop injury rating |
|---|---|---|---|
| Oryzalin plus MCPA | ¼+¼ | 9.3 | 0 |
| | ¼+½ | 7.3 | 0.7 |
| | ½+¼ | 9.0 | 0.3 |
| | ½+½ | 9.3 | 0 |
| | ¾+¼ | 9.3 | 1 |
| | ¾+½ | 9.4 | 0.7 |
| | 1+¼ | 9.5 | 1.7 |
| | 1+½ | 9.7 | 1.3 |
| Oryzalin plus Dicamba | ¼+⅛ | 9.3 | 0 |
| | ¼+¼ | 6.3 | 0 |
| | ½+⅛ | 9.4 | 0 |
| | ½+¼ | 9.0 | 0 |
| | ¾+⅛ | 9.3 | 0 |
| | ¾+¼ | 9.4 | 0.3 |
| | 1+⅛ | 9.7 | 0 |
| | 1+¼ | 9.8 | 0 |
| Oryzalin plus MCPA plus Dicamba | ½+¼+⅛ | 9.8 | 0 |
| | ½+½+¼ | 9.2 | 1.0 |
| | 1+¼+⅛ | 9.3 | 3.3 |
| | 1+½+¼ | 9.8 | 0 |
| Oryzalin | ¼ | 9.2 | 0.7 |
| | ½ | 9.3 | 0.3 |
| | ¾ | 9.3 | 1.0 |
| | 1 | 9.4 | 0.3 |
| MCPA (K salt) | ¼ | 1.3 | 0 |
| | ½ | 3.7 | 0.3 |
| Dicamba | ⅛ | 1.0 | 0.3 |
| | ¼ | 1.7 | 0 |
| Control | | 3.3 | 0 |

I claim:

1. A process for eliminating virtually all weed species from rice paddies comprising the application to a paddy in which rice has been transplanted at least 6 days previously of from ⅛ to ½ pound per acre of N⁴,N⁴-di-n-propyl-3,5-dinitrosulfanilamide in synergistic combination with from ¹⁄₁₆ to ¼ pound per acre of 2,4-dichlorophenoxyacetic acid represented by the formula:

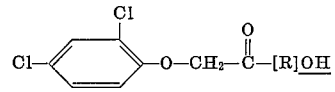

or from ¹⁄₁₆ to ⅛ pound per acre of 2-methyl-4-chlorophenoxyacetic acid represented by the formula:

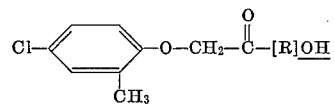

or from ¹⁄₁₆ to ⅛ pound per acre of 2-methoxy-3,6-dichlorobenzoic acid represented by the formula:

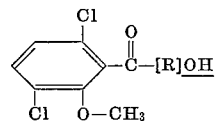

2. A process according to claim 1 comprising the application of from ⅛ to ½ pound per acre of N⁴,N⁴-di-n-propyl-3,5-dinitrosulfanilamide applied in combination with from ¹⁄₁₆ to ¼ pound per acre of 2,4-dichlorophenoxyacetic acid represented by the formula:

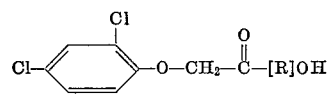

3. A process according to claim 1 comprising the application of from ⅛ to ½ pound per acre of N⁴,N⁴-di-n-propyl-3,5-dinitrosulfanilamide in combination with from 1/16 to 1/8 pound per acre of 2-methyl-4-chlorophenoxy-acetic acid represented by the formula:

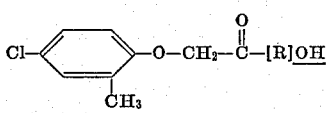

4. A process according to claim 1 comprising the application of from 1/8 to 1/2 pound per acre of N⁴,N⁴-di-n-propyl-3,5-dinitrosulfanilamide in combination with from 1/16 to 1/8 pound per acre of 2-methoxy-3,6-dichlorobenzoic acid represented by the formula:

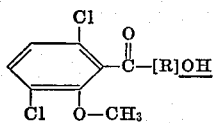

References Cited

UNITED STATES PATENTS 3,367,949  2/1968  Soper _____ 71—103
3,443,927  5/1969  Unger _____ 71—103

OTHER REFERENCES

Lou et al., "Weed erad. with chemicals, etc."; (1964) CA 62 p. 9705 (1965).

Ciferri, "Selective hormonal weed removal etc."; (1954) CA 51 p. 4629 (1951).

Shell Int. Res., "Selective herb. composition" (1964) CA 62 pp. 2190–91 (1965).

Lucero, "Tests of herbicides for the control, etc."; (1953) CA 49 p. 3457 (1955).

Weeds vol. 15, July, 1967 (no. 3) "Common and chemical names of herbicides" (back cover).

LEWIS GOTTS, Primary Examiner

G. HOLLRAH, Assistant Examiner

U.S. Cl. X.R.

71—88, 107, 109, 110, 115, 116, 117, 118